United States Patent
Aiba

(10) Patent No.: US 6,371,739 B1
(45) Date of Patent: Apr. 16, 2002

(54) METHOD AND APPARATUS FOR APPLYING PRE-LOAD TO THE BEARING STRUCTURE OF A DRIVE SHAFT THAT IS DIRECTLY DRIVEN BY AN ELECTRIC MOTOR

(75) Inventor: Osamu Aiba, Kusatsu (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/482,437

(22) Filed: Jan. 13, 2000

(30) Foreign Application Priority Data

Jan. 22, 1999 (JP) .......................... 11-014888

(51) Int. Cl.[7] .................... F04B 17/00; F04B 35/00
(52) U.S. Cl. .................. 417/410.5; 384/446; 384/517
(58) Field of Search ................... 417/410.5, 363, 417/365, 53; 384/446, 517

(56) References Cited

U.S. PATENT DOCUMENTS

| 4,184,810 A | * | 1/1980 | Dyhr et al. ............... 417/363 |
| 5,006,045 A | * | 4/1991 | Shimoda et al. .......... 417/410 |
| 5,007,810 A | * | 4/1991 | Fraser, Jr. et al. ........ 417/410 |
| 5,110,268 A | * | 5/1992 | Sakurai et al. ............ 417/410 |
| 5,213,489 A | * | 5/1993 | Kawahara et al. ........ 418/55.1 |
| 5,374,166 A | * | 12/1994 | Fukui ....................... 417/410 |
| 5,395,214 A | * | 3/1995 | Kawahara et al. ......... 417/53 |
| 5,452,989 A | * | 9/1995 | Rood et al. ................ 417/29 |
| 6,106,254 A | * | 8/2000 | Hirooka et al. ........... 418/55.6 |

FOREIGN PATENT DOCUMENTS

| JP | 1-290982 | 11/1989 |
| JP | 727073 | 1/1995 |

* cited by examiner

Primary Examiner—Charles G. Freay
Assistant Examiner—William H. Rodriguez
(74) Attorney, Agent, or Firm—Jordan and Hamburg LLP

(57) ABSTRACT

A crankshaft directly connected to an electric motor and operably connected to a drive load is supported at two locations with bearings that are respectively subject to different amount of bearing loads. A resilient member is interposed between the inner race of one or both of the bearings and the crankshaft for applying an axial pre-load to the bearings. The weight of the crankshaft and the rotor, and/or a magnetic attractive force generated in the electric motor is/are applied to the bearing as an axial pre-load in addition to the pre-load by the resilient member.

11 Claims, 4 Drawing Sheets

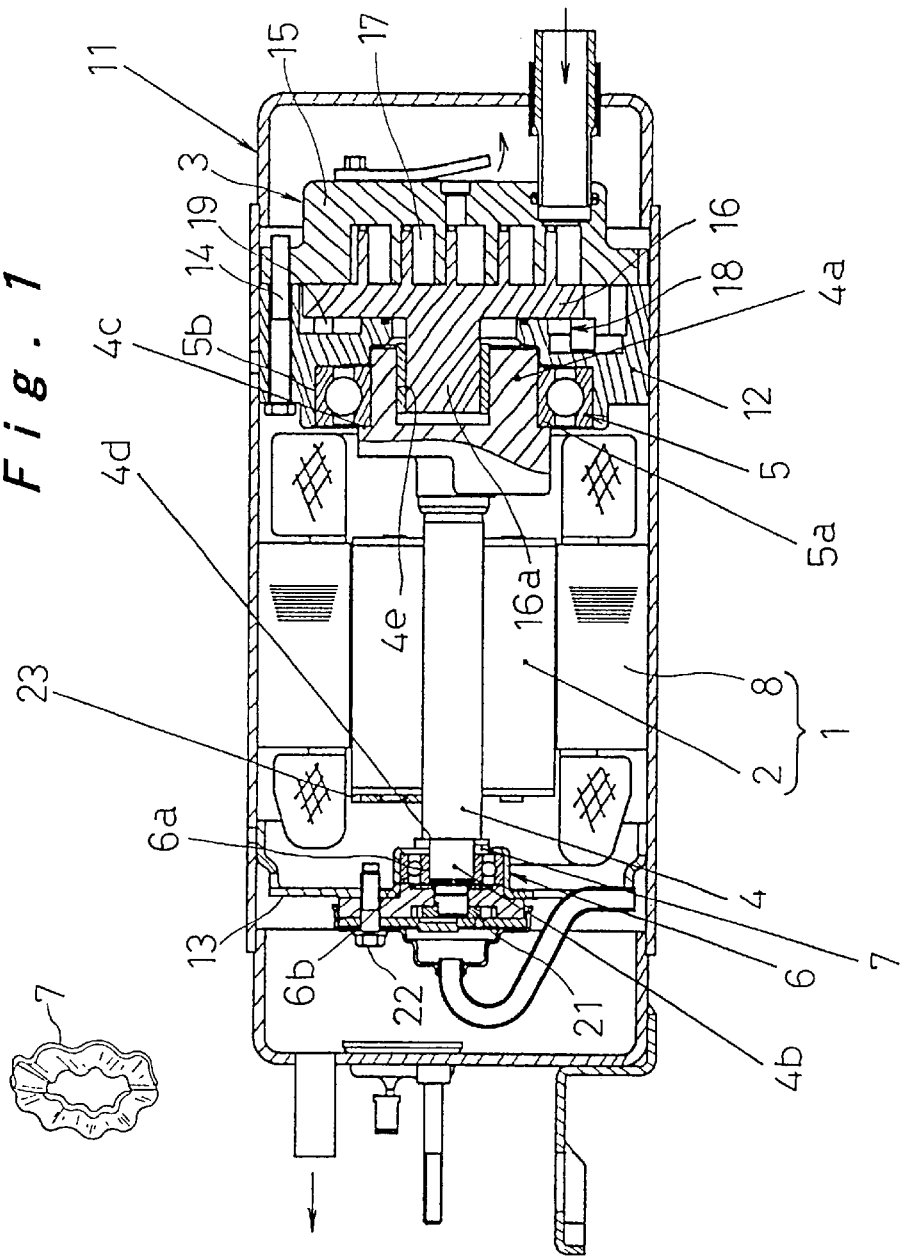

METHOD AND APPARATUS FOR APPLYING PRE-LOAD TO THE BEARING STRUCTURE OF A DRIVE SHAFT THAT IS DIRECTLY DRIVEN BY AN ELECTRIC MOTOR

BACKGROUND

The present invention relates to a method and apparatus for applying pre-load to a bearing structure of a drive shaft that is directly driven by an electric motor, and a sealed compressor in which this bearing structure is incorporated.

A bearing structure of an electric-motor-driven shaft, wherein the shaft is supported at both ends, is employed, for example, in a sealed compressor.

A typical sealed compressor is shown in FIG. 5. An electric motor 101 is built into a hermetic container 109. A crankshaft 104 is connected to a rotor 102 of the electric motor 101 for driving a compression mechanism 103. A stator 108 of the electric motor 101 is fixed in the hermetic container 109. The crankshaft 104 is supported on the side of the compression mechanism 103 by a main bearing 105 with a greater bearing load, while it is supported by a sub bearing 106 at the side of the electric motor 101 with a smaller bearing load.

The bearing load of the main bearing 105 is set greater than that of the sub bearing 106 since the crankshaft 104 at one end is subject to the centrifugal load generated by eccentric rotation of the crankshaft 104 and an orbiting scroll 107 of the compression mechanism 103, and also subject to the gas pressure exerted thereto when a fluid such as refrigerant is compressed.

Both the main bearing 105 and the sub bearing 106 are roller bearings. It is the common practice to apply a pre-load to the bearing structure in order to suppress the generation of vibration or noise inherently caused by the play that is present between the rolling members and the races of the bearing.

After various experiments and intensive research for developing a compressor that meets the demands of high-speed operation, noise suppression, and durability, the inventors of the present application have found that the conventional method of applying pre-load is not capable of resolving the problems of vibration and noise.

Specifically, the pre-load is uniformly applied to both the main bearing and sub bearing in the conventional method, where a pre-load should be suitably applied to each of the main bearing and the sub bearing in accordance with their bearing loads that are different from each other.

SUMMARY OF THE INVENTION

In view of the foregoing, an object of the present invention is to provide a method and apparatus for applying pre-load to the bearing structure of an electric-motor-driven shaft, with which pre-load can act on the bearing in accordance with the difference in bearing load so as to suppress vibration and noise. It is a further object to provide a sealed compressor in which this bearing structure is incorporated.

To accomplish the above object, the present invention provides a method of, and apparatus for, applying pre-load to bearings of a drive shaft that is directly connected to a rotor of an electric motor and is operably connected to a drive load, wherein the bearings support the drive shaft at two locations, i.e., at the side of the electric motor and at the side of the drive load, with respectively different bearing loads. A pre-load is applied to the bearings in an axial direction by providing a resilient member between an inner race of either one or both of the bearings and the drive shaft. In addition, a pre-load is applied in an axial direction to one of the bearings of which bearing load is greater than the other by the weight of the drive shaft and the rotor of the electric motor, either alone or in combination with a magnetic attractive force generated in the electric motor. The rotor of the electric motor is arranged offset with respect to a stator of the electric motor, so that the magnetic attractive force is generated in a direction opposite from a direction of offset of the rotor with respect to the stator while the electric motor is driven.

The above method and apparatus for applying pre-load to bearings of a drive shaft can be advantageously applied to a sealed compressor, comprising a compression mechanism and an electric motor housed in a hermetic container, wherein a crankshaft directly connected to the electric motor is supported at both ends by a main bearing and a sub bearing.

According to the present invention, the resiliency of the resilient member interposed between the inner race of one or both of the bearings acts equally on both of the bearings through the common crankshaft, while the weight of the crankshaft and the rotor of the electric motor and/or the magnetic attractive force generated in the electric motor act on the bearing which is subject to a greater bearing load than the other as a pre-load in the axial direction. As a result, the pre-loads combine with or counterbalance each other in accordance with the position and direction in which the pre-loads are applied to both bearings. Therefore, a pre-load of suitable amount can be respectively applied to each of the bearings in accordance with their different bearing loads. Accordingly, the generation of vibration and noise caused by the play in the bearings during the rotation of the crankshaft can be satisfactorily suppressed.

While novel features of the invention are set forth in the preceding, the invention, both as to organization and content, can be further understood and appreciated, along with other objects and features thereof, from the following detailed description and examples when taken in conjunction with the attached drawings.

BRIEF DESCRIPTION OF THE DRAWINGS

FIG. 1 is a cross-sectional view showing one embodiment of a sealed compressor according to the present invention, and one example of the method and apparatus of applying pre-load to the bearing structure of the electric-motor-driven shaft in this sealed compressor;

FIG. 2 is a perspective view showing a resilient member used for applying pre-load to the bearing in the sealed compressor of FIG. 1;

DETAILED DESCRIPTION

Figure 3:
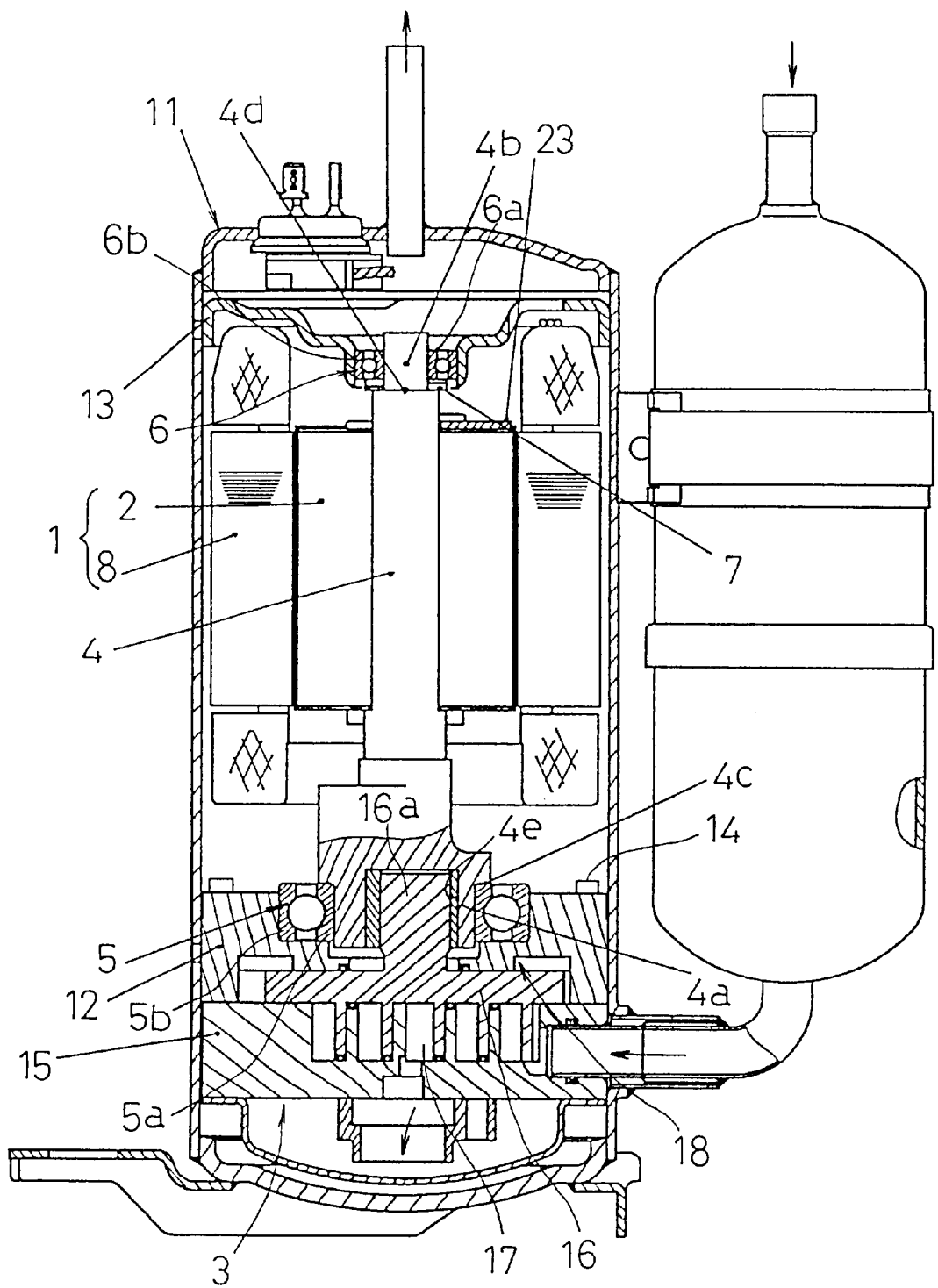
FIG. 3 is a cross-sectional view showing another embodiment of a sealed compressor according to the present invention, and one example of the method and apparatus of applying pre-load to the bearing structure of the electric-motor-driven shaft in this sealed compressor.

Preferred embodiments of the method and apparatus for applying pre-load to the bearing structure of an electricmotor-driven shaft and the sealed compressor using the bearing structure according to the present invention will be hereinafter described with reference to FIG. 1 through FIG. 4.

The following embodiments demonstrate one example of the case wherein the present invention is applied to an air-conditioning or refrigerating sealed compressor. The present invention is not limited to such specific application and can be advantageously applied to various appliances that have shafts in various forms which are directly driven by an electric motor.

In the embodiment as shown in the drawings of the sealed compressor in FIG. 1 to FIG. 4, a crankshaft 4, which is directly connected to a rotor 2 of an electric motor 1 and is also connected to a compression mechanism 3, is supported at both ends by a main bearing 5 and a sub bearing 6 that are respectively subject to a larger and a smaller bearing load. According to the present invention, axial pre-load respectively acts on the main bearing 5 and sub bearing 6 in accordance with their bearing loads.

According to the present invention, a resilient member 7 is provided in a sealed condition between the inner race 5a and/or 6a of the main bearing 5 and/or the sub bearing 6 and the crankshaft 4 for providing pre-load in an axial direction, and in combination with the pre-load applied by the resilient member, the magnetic attractive force is applied to the inner race 5a of the main bearing 5 to which a larger bearing load is applied through the crankshaft 4 as an axial pre-load. In this case, the rotor 2 of the electric motor 1 is offset with respect to the stator 8 of the electric motor 1 in one direction, and when the rotor 2 is rotated, it is subject to a magnetic attractive force in a direction opposite the offset direction of the rotor Alternatively, or in addition to this, the weight of the crankshaft 4 together with the rotor 2 when it is set vertically can be applied as a pre-load to whichever one of the main bearing 5 and sub bearing 6 has the greater bearing load.

Figure 4:
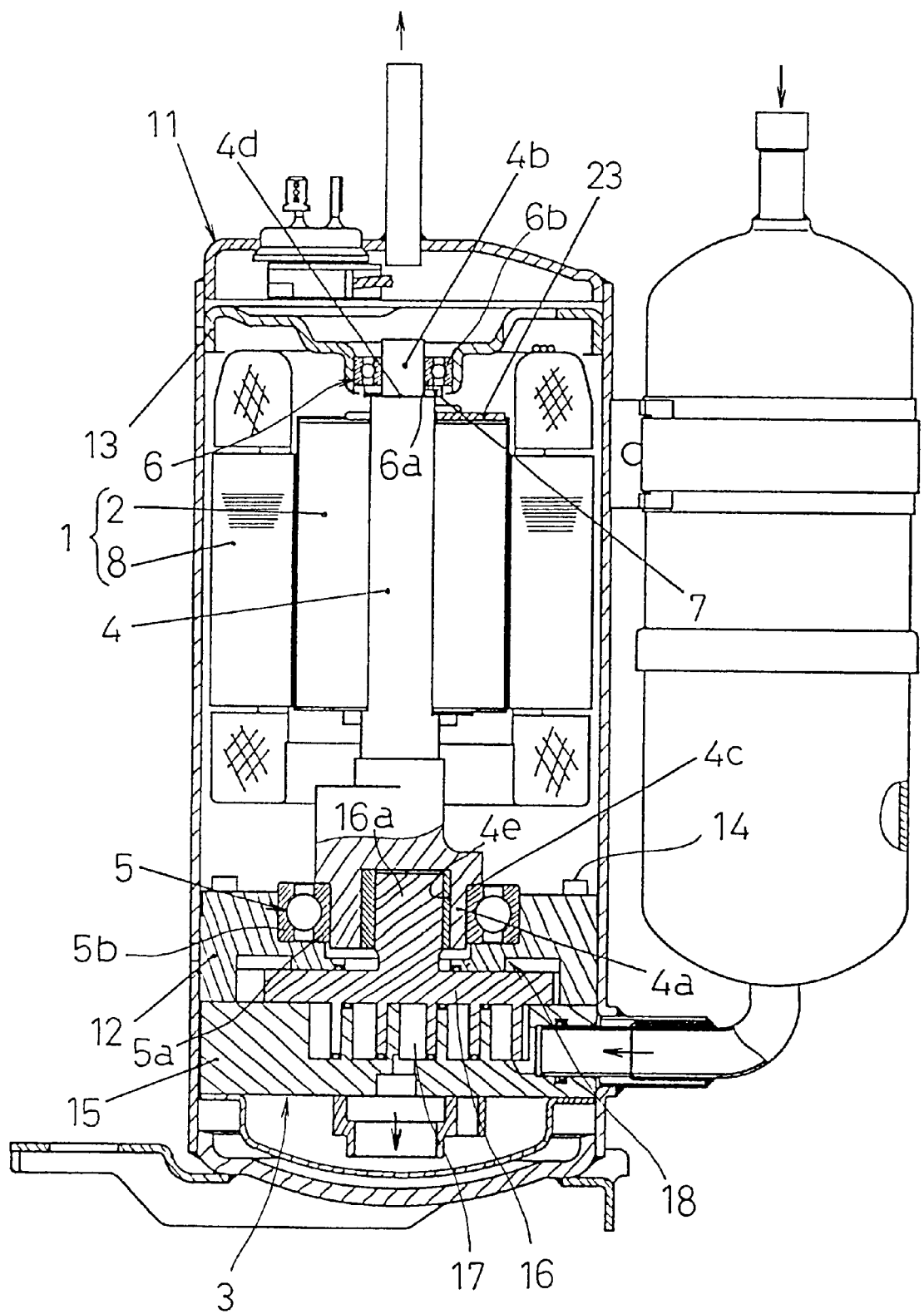
FIG. 4 is a cross-sectional view showing yet another embodiment of a sealed compressor according to the present invention, and one example of the method and apparatus of applying pre-load to the bearing structure of the electric-motor-driven shaft in this sealed compressor.
Figure 5:
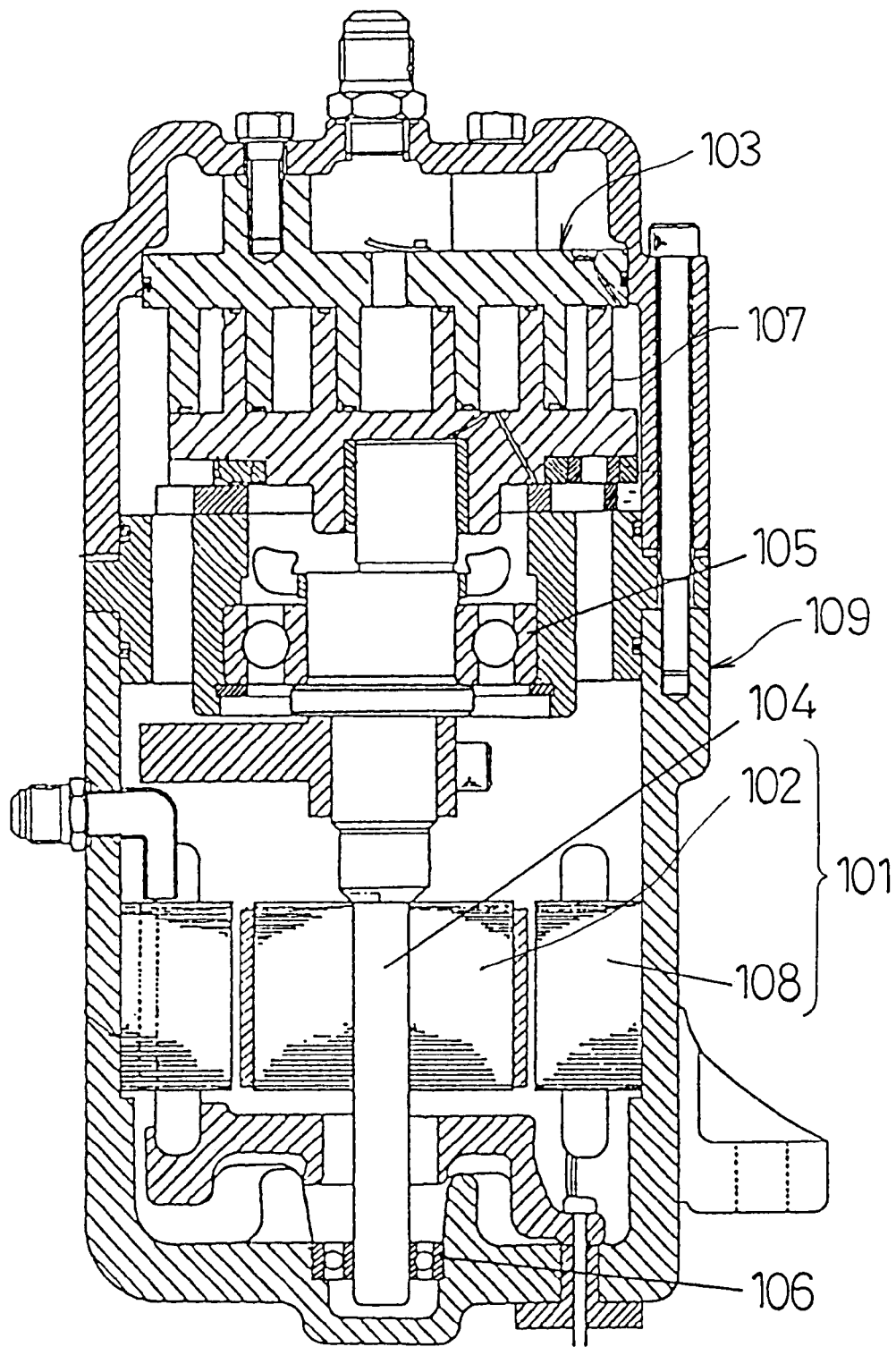
FIG. 5 is a cross-sectional view showing a conventional sealed compressor, and one example of the method and apparatus of applying pre-load to the bearing structure of the electric-motor-driven shaft in this sealed compressor.

The resilience of the resilient member 7 interposed between the crankshaft 4 and either one or both of the inner races 5a, 6a of the main bearing and sub bearing 5, 6 acts on the main bearing and sub bearing 5, 6 as a uniform pre-load. The weight of the crankshaft 4 together with the rotor 2 can be applied to the inner race 5a of the main bearing 5 if the crankshaft 4 is set vertically as shown in FIG. 3 or FIG. 4. The magnetic attractive force generated when the rotor 2 is driven in a direction opposite from the offset direction of the rotor 2 with respect to the stator 8 is also applied to the inner race 5a of the main bearing 5. The weight of the crankshaft 4 may be utilized as the pre-load not only when the crankshaft is vertically set but also when it is arranged in an angled condition. The pre-load by the magnetic attractive force always acts on the bearing, irrespective of the orientation of the crankshaft 4 such as horizontal as shown in FIG. 3 or FIG. 4, or vertical as shown in FIG. 1.

The pre-load applied by the resilient member 7 and the pre-load by the weight and/or the magnetic attractive force combine with or counterbalance each other in accordance with the position and direction in which the pre-loads are applied to the main bearing 5 and the sub bearing 6. As a result, a pre-load of suitable amount can be respectively applied to the main bearing and sub bearing in accordance with their different bearing loads. Specifically, the resilient member generates a force of about 2–5 kgf while the weight of the crankshaft 4 and the magnetic attractive force exert loads of about 1–3 kgf and 1–5 kgf, respectively. Accordingly, the generation of vibration and noise caused by the play in the bearings during the rotation of the crankshaft 4 can be satisfactorily suppressed.

FIG. 1 shows a horizontally-set, brushless type sealed compressor that is substantially maintenance-free. The electric motor 1 and the compression mechanism 3 are housed in the hermetic container 11. The stator 8 of the electric motor 1 is fixed to the inner wall of the hermetic container 11 by shrinkage-fitting. The main bearing 5 is a ball bearing, and comprises a main bearing assembly 12 fixed to the inner wall of the hermetic container 11 by welding or the like. An outer race 5b of the main bearing 5 is held by the main bearing assembly 12 on the side of the electric motor 1. The main shaft 4a of the cranks haft 4 is fitted into the inner race 5a of the main bearing 5, thereby being supported. The sub bearing 6 is also a ball bearing, and comprises a sub bearing assembly 13 fixed to the inner wall of the hermetic container 1 by welding or the like. An outer race 6b of the sub bearing 6 is held by the sub bearing assembly 13 on the opposite side from the electric motor 1. The sub shaft 4b of the crankshaft 4 is fitted into the inner race 6a of the sub bearing 6, thereby being supported.

The compression mechanism 3 is a scroll type compression mechanism, in which a stationary scroll 15 is fixed on the outer side of the main bearing assembly 12 by a bolt 14, and an orbiting scroll 16 is fitted in between the main bearing assembly 12 and the stationary scroll 15. The wraps of the stationary scroll 15 and the orbiting scroll 16 mesh with each other to define therebetween a plurality of compression chambers 17. An orbiting shaft 16a on the backside of the orbiting scroll 16 is fitted into an eccentric hole 4e of the main shaft 4a of the crankshaft 4. A rotation prevention member 18 such as an Oldam's ring which prevents the orbiting scroll 16 from rotating about its own axis is provided between the orbiting scroll 16 and the main bearing assembly 12. With this construction, when the crankshaft 4 is rotatably driven by the electric motor 1, the main shaft 4a rotates and drives the orbiting scroll 16 to orbit, whereby a refrigerant is sucked, compressed, and discharged repeatedly between the orbiting scroll 16 and the stationary scroll 15 for supplying a compressed refrigerant to the air-conditioning or refrigerating appliance.

It should be noted that the present invention can be applied to a compression mechanism in which a rotary piston is employed or to any other types of appliances in which a shaft is supported at both ends and has problems similar to those that the present invention addresses.

A lubricant pump 21 is fixed to the outside of the sub bearing assembly 13 by a bolt 22 such that when it is driven by the crankshaft 4, the oil reserved in the lower part of the hermetic container 11 is sucked up and supplied to each sliding part through a passage provided within the crankshaft 4. A balance weight 23 is provided to the rotor 2 in the vicinity of the sub shaft 4b of the crankshaft 4.

Although both of the bearings 5, 6 are radial bearings, they support the crankshaft 4 in the thrust direction between the opposing main bearing 5 of the main bearing assembly 12 and the sub bearing 6 of the sub bearing assembly 13 with their respective inner races 5a, 6a contacted with opposing end surfaces 4c, 4d of the crankshaft 4. The crankshaft 4 is thereby supported and positioned at two locations in the thrust direction by the main bearing and sub bearing 5, 6. The main bearing 5 receives loads generated from the centrifugal force of the eccentric parts within the compression mechanism 3 when the crankshaft 4 is rotated, and the gas pressure of the compressed refrigerant, while the sub bearing 6 supports the centrifugal force of the offset balance weight 23 when it is rotated. Thus the bearing load of the main bearing 5 is greater than that of the sub bearing 6, and the main bearing 5 is accordingly of larger size than the sub bearing 6.

Despite the positioning of the crankshaft 4 by the main bearing 5 and the sub bearing 6 as mentioned above, slight play is present between the balls that serve as rolling members of the main and sub bearings 5, 6 and the inner and outer races 5a, 6a, and 5b, 6b, which causes vibration and noise. This problem is addressed by applying pre-load as mentioned above. Specifically in this embodiment, a corrugated spring washer as shown in FIG. 2 is employed as the resilient member 7, this being provided only between the inner race 6a of the sub bearing 6 and the end surface 4d of the crankshaft 4. In this way, the spring washer that is compressed between the inner race 6a of the sub bearing 6 and the crankshaft 4 exhibits a resilient force in an axial direction and this resiliency acts equally on both of the main bearing 5 and the sub bearing 6 as a pre-load. The resilient member 7 may be any of spring washers such as dish-like spring washer or a twisted spring washer that exhibits resiliency in the axial direction, or any other springs and rings made of resilient material such as plastic or rubber. These may also be used in combination depending on cases.

At the same time, the rotor 2 of the electric motor 1 is arranged offset with respect to the stator 8 toward the opposite side from the compression mechanism 3. Therefore, when the electric motor 1 is driven, the rotor 2 is subject to a magnetic attractive force generated between itself and the stator 8 toward the compression mechanism 3. This magnetic attractive force acts on the inner race 5a of the main bearing 5 as a pre-load in addition to the pre-load applied by the resilient member 7. Accordingly, the main bearing 5 is subject to the pre-load larger than that of the sub bearing 6 because of the magnetic attractive force, as a result of which the main bearing 5 and the sub bearing 6 receive pre-loads of suitable amount in accordance with the difference in their bearing loads. Vibration and noise generated in the main and sub bearings 5, 6 are thereby satisfactorily suppressed.

If the resilient member 7 is interposed between the inner race 5a of the main bearing 5 and the end surface 4c of the crankshaft 4, the pre-load that acts on the main bearing 5 remains the same, but the sub bearing 6 receives a pre-load that is even smaller than the pre-load applied in the case described above where the resilient member 7 is provided to the sub bearing side, because of the magnetic attractive force that acts in a direction toward the compression mechanism 3.

Of course, the resilient member 7 may be provided to both of the main bearing 5 and the sub bearing 6 such that the pre-loads are counterbalanced or combined and applied suitably for each of the bearings. However, it is more preferable that the resilient member 7 be provided to the sub bearing side only, as it is smaller than the main bearing and thus the whole structure for applying pre-load can be made compact, whereby cost can be reduced.

FIG. 3 shows a vertical type sealed compressor according to a second embodiment of the present invention. This compressor is vertically set with the compression mechanism 3 downwards, and the rotor 2 of the electric motor 1 is not offset with respect to the stator 8. The weight of the crankshaft 4 together with the rotor 2 is applied to the main bearing 5 as a pre-load. The construction and operation of the sealed compressor of the second embodiment are substantially identical to those of the sealed compressor of the first embodiment except the circulation mechanism of the lubricant is different. Same elements are given the same reference numerals, and the description of those that have been already described will not be repeated.

The resilient member 7 provided between the inner race 6a of the sub bearing 6 and the end surface 4d of the crankshaft 4 exerts an equal pre-load to both of the main and sub bearings 5, 6, while the pre-load by the weight of the crankshaft 4 and the rotor 2 acts only on the main bearing 5. Accordingly, the sub bearing 6 is subject to a pre-load by the resilient member 7 alone, while the main bearing 5 is subject to a greater pre-load than the sub bearing 6 due to the weight of the crankshaft 4 and the rotor 2 in addition to the pre-load by the resilient member 7.

In this case, too, if the resilient member 7 is provided between the inner race 5a of the main bearing 5 and the end surface 4c of the crankshaft 4, the sub bearing 6 is subjected to a pre-load that is even smaller than the pre-load in the case of providing the resilient member 7 to the sub bearing side because of the weight of the crankshaft 4 and the rotor 2.

Of course, the resilient member 7 may be provided to both of the main bearing 5 and the sub bearing 6 such that the pre-loads are counterbalanced or combined and applied suitably for each of the bearings.

FIG. 4 shows a vertical type sealed compressor according to a third embodiment of the present invention. The construction and operation of the sealed compressor of the third embodiment are substantially identical to those of the sealed compressor of the second embodiment except the rotor 2 of the electric motor 1 is arranged offset upwards with respect to the stator 8. Same elements are given the same reference numerals, and the description of those that have been already described will not be repeated.

The resilient member 7 provided between the inner race 6a of the sub bearing 6 and the end surface 4d of the crankshaft 4 exerts an equal pre-load to both of the main and sub bearings 5, 6, while the weight of the crankshaft 4 and the rotor 2, and the magnetic attractive force towards the compression mechanism 3 generated between the rotor 2 and the stator 8 both act only on the main bearing 5. Accordingly, the sub bearing 6 is subject to a pre-load by the resilient member 7 alone, while the main bearing 5 is subject to a much greater pre-load than the sub bearing 6 due to the weight of the crankshaft 4 and the rotor 2, and the magnetic attractive force toward the compression mechanism 3, in addition to the pre-load by the resilient member 7.

In this case, too, if the resilient member 7 is provided between the inner race 5a of the main bearing 5 and the end surface 4c of the crankshaft 4, the sub bearing 6 is subjected to a pre-load that is even smaller than the pre-load in the case of providing the resilient member 7 to the sub bearing side because of the weight of the crankshaft and the rotor, and the magnetic attractive force, both of which act in a direction toward the compression mechanism.

Of course, the resilient member 7 may be provided to both of the main bearing 5 and the sub bearing 6 such that the pre-loads are counterbalanced or combined and applied suitably for each of the bearings.

As described above, pre-load is applied to the bearings that support a drive shaft at both ends by using resiliency of a resilient member, a magnetic attractive force generated in an electric motor, and the weight of the drive shaft in accordance with the difference in bearing load of the bearings. Vibration or noise generated during the rotation of the drive shaft can be thereby sufficiently suppressed.

Although the present invention has been fully described in connection with the preferred embodiment thereof, it is to be noted that various changes and modifications apparent to those skilled in the art are to be understood as included within the scope of the present invention as defined by the appended claims unless they depart therefrom.

What is claimed is:

1. A method of applying pre-load to ball bearings of a drive shaft that is directly connected to a rotor of an electric motor and which is operably connected to a drive load, wherein the ball bearings support the drive shaft at two locations which include at a side of the electric motor and at a side of the drive load with respectively different bearing loads, the method comprising the steps of:

applying a pre-load to the ball bearings in an axial direction by providing a resilient member between the drive shaft and an inner race of at least one of the ball bearings; and applying an additional pre-load in an axial direction to a particular one of the ball bearings which supports greater load than a remaining one of the ball bearings.

2. The method according to claim 1, wherein said step of applying an additional pre-load includes vertically orienting said drive shaft and locating said particular one of the ball bearings which supports greater load in a lower position than said remaining one of the ball bearings such that the weight of the drive shaft and the rotor of the electric motor exerts a downward pressure on said particular one of the ball bearings.

3. The method according to claim 1, wherein said step of applying an additional pre-load includes:

arranging the rotor of the electric motor offset in an axial direction with respect to a stator of the electric motor whereby a magnetic attractive force is generated in a direction opposite from a direction of offset of the rotor with respect to the stator while the electric motor is driven; and orienting the ball bearings relative to said direction of offset such that the magnetic attractive force is exerted on said particular one of the ball bearings which supports greater load.

4. An apparatus for applying pre-load to ball bearings of a drive shaft directly connected to a rotor of an electric motor and which is operably connected to a drive load, comprising:

a first ball bearing that supports the drive shaft at a side of the electric motor;

a second ball bearing that supports the drive shaft at an opposite side from the first ball bearing, load acting on the second ball bearing being larger than a corresponding load acting on the first ball bearing;

a resilient member interposed in a compressed state between an inner race of the first ball bearing and the drive shaft so as to apply a pre-load respectively to the first and second ball bearings in opposite axial directions; and means for applying an additional pre-load in an axial direction to the second ball bearing in addition to the pre-load applied by the resilient member.

5. The apparatus according to claim 4, wherein said means for applying the additional pre-load includes a vertical arrangement of the drive shaft and the rotor wherein the weight thereof acts as the additional pre-load on the second ball bearing which is disposed in a lower position than the first ball bearing.

6. The apparatus according to claim 4, wherein said means for applying the additional pre-load includes an offset arrangement of the rotor of the electric motor with respect to a stator of the electric motor such that a magnetic attractive force acting on the crankshaft is generated in the electric motor in an axial direction, said magnetic attractive force being applied as the additional pre-load to the second ball bearing in addition to the pre-load applied by the resilient member.

7. The apparatus according to claim 6, wherein said means for applying the additional pre-load further includes a vertical arrangement of the drive shaft and the rotor wherein the weight thereof acts on the second ball bearing which is disposed in a lower position than the first ball bearing as another additional pre-load in addition to the magnetic attractive force generated in the electric motor.

8. A sealed compressor, comprising:

a hermetic container;

a compression mechanism housed in the hermetic container;

an electric motor including a rotor and a stator that is fixed in the hermetic container;

a crankshaft directly connected to the rotor of the electric motor;

a main ball bearing for supporting the crankshaft at a side of the compression mechanism;

a sub ball bearing for supporting the crankshaft with a bearing load smaller than that of the main ball bearing at a side of the electric motor;

a resilient member that is interposed in a compressed state between an inner race of the sub ball bearing and the drive shaft so as to apply a pre-load respectively to the main ball bearing and the sub ball bearing in opposite axial directions; and means for applying an additional pre-load in an axial direction to the main ball bearing in addition to the pre-load applied by the resilient member.

9. The sealed compressor according to claim 8, wherein said means for applying the additional pre-load includes a vertical arrangement of the crankshaft and the rotor wherein the weight thereof acts as the additional pre-load on the main ball bearing which is disposed in a lower position than the sub ball bearing.

10. The sealed compressor according to claim 8, wherein said means for applying the additional pre-load includes an axially offset arrangement of the rotor of the electric motor with respect to a stator of the electric motor such that a magnetic attractive force acting on the crankshaft is generated in the electric motor in an axial direction, said magnetic attractive force being applied as the additional pre-load to the main ball bearing in addition to the pre-load applied by the resilient member.

11. The sealed compressor according to claim 10, wherein said means for applying the additional pre-load further includes a vertical arrangement of the crankshaft and the rotor wherein the weight of the crankshaft and the rotor of the electric motor acts on the main bearing as another additional pre-load in addition to the magnetic attractive force generated in the electric motor.

* * * * *